US009305324B2

(12) United States Patent
McGuire et al.

(10) Patent No.: US 9,305,324 B2
(45) Date of Patent: Apr. 5, 2016

(54) SYSTEM, METHOD, AND COMPUTER PROGRAM PRODUCT FOR TILED DEFERRED SHADING (71) Applicant: NVIDIA Corporation, Santa Clara, CA (US)

(72) Inventors: Morgan McGuire, Williamstown, MA (US); Michael Thomas Mara, Williamstown, MA (US); David Patrick Luebke, Charlottesville, VA (US); Jacopo Pantaleoni, Berlin (DE)

(73) Assignee: NVIDIA Corporation, Santa Clara, CA (US)

( * ) Notice: Subject to any disclaimer, the term of this patent is extended or adjusted under 35 U.S.C. 154(b) by 197 days.

(21) Appl. No.: 14/015,955

(22) Filed: Aug. 30, 2013

(65) Prior Publication Data
US 2014/0176575 A1 Jun. 26, 2014

Related U.S. Application Data (60) Provisional application No. 61/745,264, filed on Dec. 21, 2012.

(51) Int. Cl.
*G06T 1/20* (2006.01)
*G06T 11/40* (2006.01)
*G06T 15/00* (2011.01)
*G06T 15/06* (2011.01)

(52) U.S. Cl.
CPC . *G06T 1/20* (2013.01); *G06T 11/40* (2013.01); *G06T 15/005* (2013.01); *G06T 15/06* (2013.01)

(58) Field of Classification Search
CPC ......... G06T 11/00; G06T 15/00; G06T 15/60; G06T 15/06; G06T 1/20; G06T 15/80; G06T 11/40; G06T 15/005
USPC .................................................. 345/426, 505
See application file for complete search history.

(56) References Cited

U.S. PATENT DOCUMENTS

| 5,251,296 A | 10/1993 | Rhoden et al. |
| 2007/0046686 A1* | 3/2007 | Keller ............................ 345/581 |
| 2008/0079719 A1* | 4/2008 | Woo .............................. 345/419 |

(Continued)

FOREIGN PATENT DOCUMENTS

TW 1390400 B 3/2013

OTHER PUBLICATIONS

Akenine-Möller et al., "Real Time Rendering," Third Edition, A.K. Peters, Ltd., 2008, pp. 1-1045.

(Continued)

*Primary Examiner* — Phi Hoang
*Assistant Examiner* — Michael Le
(74) *Attorney, Agent, or Firm* — Zilka-Kotab, PC (57) ABSTRACT A system, method, and computer program product are provided for tiled deferred shading. In operation, a plurality of photons associated with at least one scene are identified. Further, a plurality of screen-space tiles associated with the at least one scene are identified. Additionally, each of the plurality of screen-space tiles capable of being affected by a projection of an effect sphere for each of the plurality of photons are identified. Furthermore, at least a subset of photons associated with each of the screen-space tiles from which to compute shading are selected. Moreover, shading for the at least one scene is computed utilizing the selected at least a subset of photons.

15 Claims, 7 Drawing Sheets

(56) References Cited

U.S. PATENT DOCUMENTS

| | | | |
|---|---|---|---|
| 2010/0033482 A1* | 2/2010 | Zhou et al. | 345/424 |
| 2010/0079452 A1* | 4/2010 | Zhou et al. | 345/420 |
| 2011/0227921 A1 | 9/2011 | Redshaw | |
| 2012/0038644 A1* | 2/2012 | Jones et al. | 345/426 |
| 2013/0271465 A1* | 10/2013 | Clarberg et al. | 345/426 |

OTHER PUBLICATIONS

Andersson, J., "DirectX Rendering in Battlefield 3," Mar. 2011, pp. 1-28.

Dammertz et al., "Edge-Avoiding A-Trous Wavelet Transform for fast Global Illumination Filtering," Proceedings of HPG, Eurographics Association, 2010, pp. 1-9.

Eberly, D., "Perspective Projection of an Ellipsoid," Geometric Tools, LLC, Mar. 2, 1999, pp. 1-4.

Hachisuka et al., "State of the Art Photon Density Estimation," SIGGRAPH 2012 Courses, Aug. 9, 2012, pp. 1-527.

Jakob et al., "Progressive Expectation-Maximization for Hierarchical Volumetric Photon Mapping," Eurographics Symposium on Rendering 2011, vol. 30, No. 4, 2011, pp. 1-11.

Jarosz et al., "Progressive Photon Beams," ACM SIGGRAPH Asia 2011 Conference Proceedings, ACM Transactions on Graphics, vol. 30, No. 6, Dec. 2011, pp. 1-12.

Jensen, H. W., "Global Illumination Using Photon Maps," Extended Version of the paper in Rendering Techniques '96, Proceedings of the Seventh Eurographics Workshop on Rendering, 1996, pp. 1-17.

Jensen, H. W., "Realistic Image Synthesis Using Photon Mapping," A.K. Peters, Ltd., 2001, pp. 1-195.

Kim, P., "Screen Space Decals in Warhammer 40,000: Space Marine," ACM SIGGRAPH 2012, Aug. 5-9, 2012, pp. 1.

Laine et al., "Two Methods for Fast Ray-Cast Ambient Occlusion," Proceedings of Eurographics Symposium on Rendering, 2010, vol. 29, No. 4, pp. 1-10.

Li, S. et al., "kANN on the GPU with Shifted Sorting," High Performance Graphics, 2012, pp. 1-9.

Ma, V. C. H. et al., "Low Latency Photon Mapping Using Block Hashing," Proceedings of the Conference on Graphics Hardware, Feb. 2002, pp. 1-11.

Maletz, D. et al., "Importance Point Projection for GPU-Based Final Gathering," Proceedings of Eurographics Symposiumon Rendering 2011, vol. 30, No. 4, 2011, pp. 1-11.

Mara, M. et al., "2D Polyhedral Bounds of a Clipped, Perspective-Projected 3D Sphere," Journal of Computer Graphics Techniques, vol. 2, No. 2, 2013, pp. 70-83.

McGuire, M. et al., "Hardware-Accelerated Global Illumination by Image Space Photon Mapping," High Performance Graphics, Aug. 1-3, 2009, pp. 77-89.

Meyer, Q. et al., "On Floating-Point Normal Vectors," Eurographics Symposium on Rendering 2010, vol. 29, No. 4, 2010, pp. 1-6.

Nichols, G. et al., "Multiresolution Splatting for Indirect Illumination," Proceedings of I3D, 2009, pp. 1-8.

Papaioannou, G., "Real-Time Diffuse Global Illumination Using Radiance Hints," High Performance Graphics 2011 Conference Proceedings, 2011, pp. 1-10.

Parker, S. G. et al., "Optix: A General Purpose Ray Tracing Engine," ACM Transactions on Graphics, 2010, pp. 1-13.

Szirmay-Kalos, L. et al., "Approximate Ray-Tracing on the GPU with Distance Impostors," Eurographics 2005, vol. 24, No. 3, 2005, pp. 1-11.

Wang, R. et al., "An Efficient GPU-Based Approach for Interactive Global Illumination," ACM Transactions on Graphics, vol. 28, No. 3, Article 91, Aug. 2009, pp. 91:1-91:8.

Wang, R., "Integer Hash Function," Version 3.1, Mar. 2007, pp. 1-5, retrieved from http://web.archive.org/web/20071223173210/http://www.concentric.net/ttwang/tech/inthash.htm.

Yao, C. et al., "Multi-Image Based Photon Tracing for Interactive Global Illumination of Dynamic Scenes," Eurographics Symposium on Rendering 2010, vol. 29, No. 4, 2010, pp. 1-10.

Zhou, K. et al., "Real-Time KD-Tree Construction on Graphics Hardware," ACM SIGGRAPH Asia '08, vol. 126, 2008, pp. 1-11.

Examination Report from German Patent Application No. 10 2013 113 714.8, dated Apr. 9, 2015.

Office Action from Taiwan Patent Application No. 102140651, dated Nov. 23, 2015.

* cited by examiner

SYSTEM, METHOD, AND COMPUTER PROGRAM PRODUCT FOR TILED DEFERRED SHADING

CLAIM OF PRIORITY

This application claims the benefit of U.S. Provisional Application No. 61/745,264, filed Dec. 21, 2012, the entire contents of which are incorporated herein by reference.

FIELD OF THE INVENTION

The present invention relates to graphics processing, and more particularly to shading in the context of graphics processing.

BACKGROUND

In graphics processing, efficiently rendering light that has scattered off multiple surfaces in the context of a real-time application, such as a video game, is highly desirable. Photon mapping is known as a consistent estimator for indirect illumination in offline rendering. Photon mapping not only excels at sampling caustic paths that converge slowly for many other rendering methods, but also estimates lower-frequency glossy and diffuse interreflection well and is surprisingly simple to implement.

Many variations on photon mapping intended for eventual real-time rendering of complex scenes have been proposed and even demonstrated on limited scenes at interactive rates. Combined with this algorithmic progress, GPUs are now powerful enough that photon mapping may be implemented in real-time rendering systems. One current challenge, however, is maintaining quality while scaling efficiently on a modern GPU.

Photon mapping includes two steps: tracing photons along rays from light sources and estimating radiance due to those photons scattering off visible surfaces (i.e., "shading"). Efficient parallel ray tracing hardware and software systems are capable of tracing hundreds of millions of rays per second and the process may be amortized over multiple frames. Thus, existing systems meet the performance needed for photon tracing. Net performance of these systems typically hinge on efficient photon shading.

Thus, there is a need for addressing this issue and/or other issues associated with the prior art.

SUMMARY

A system, method, and computer program product are provided for tiled deferred shading. In operation, a plurality of photons associated with at least one scene are identified. Further, a plurality of screen-space tiles associated with the at least one scene are identified. Additionally, each of the plurality of screen-space tiles capable of being affected by a projection of an effect sphere for each of the plurality of photons are identified. Furthermore, at least a subset of photons associated with each of the screen-space tiles from which to compute shading are selected. Moreover, shading for the at least one scene is computed utilizing the selected at least a subset of photons.

DETAILED DESCRIPTION

Figure 1:
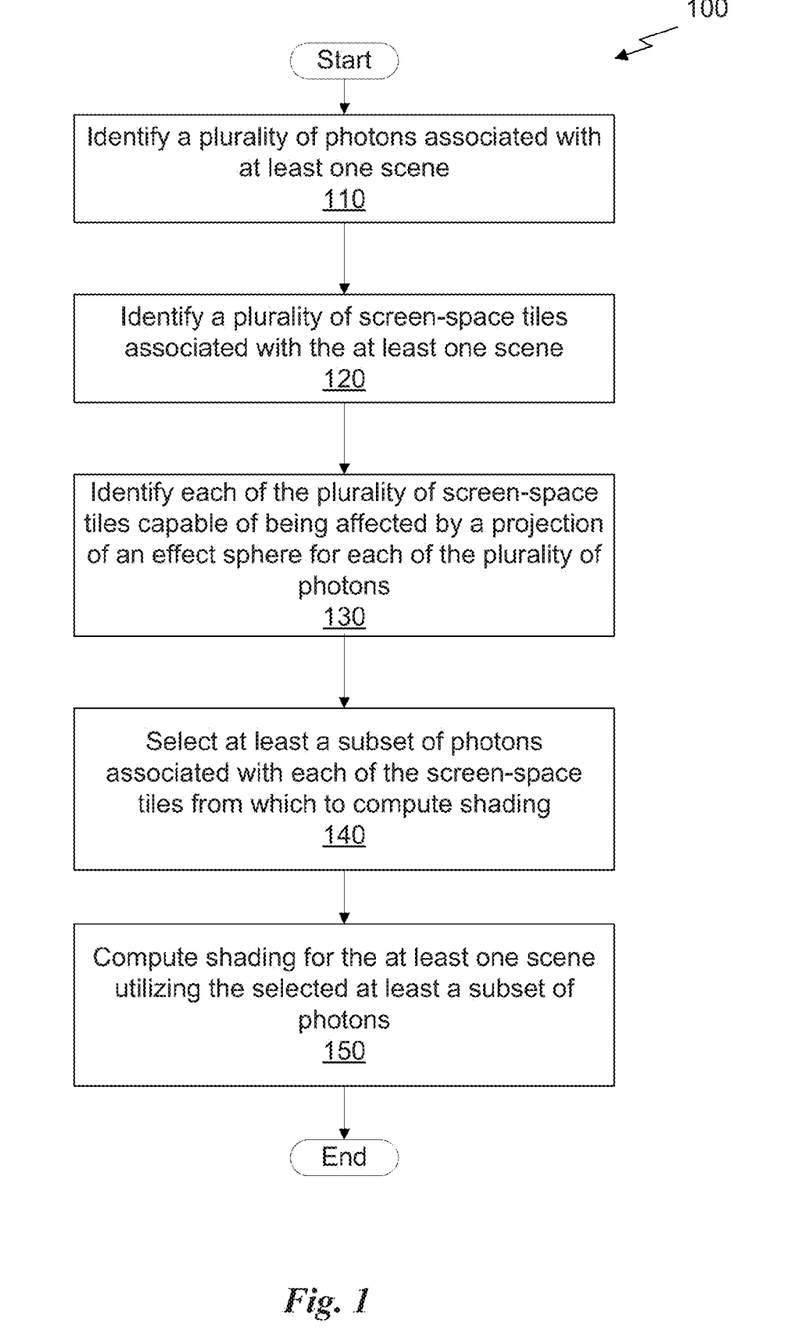
FIG. 1 illustrates a flowchart of a method for tiled deferred shading, in accordance with one embodiment.

FIG. 1 illustrates a flowchart of a method 100 for tiled deferred shading, in accordance with one embodiment. As shown in operation 110, a plurality of photons associated with at least one scene are identified. In one embodiment, the plurality of photons associated with the at least one scene may be associated with a photon mapping process. For example, the photons may be part of a process that includes tracing photons along rays from one or more light sources and estimating radiance due to those photons scattering off visible surfaces.

Further, in operation 120, a plurality of screen-space tiles associated with the at least one scene are identified. In one embodiment, the plurality of screen-space tiles associated with the at least one scene may include a plurality of pixels associated with the scene. For example, the screen-space tile may include an n×n array of pixels, where n is an integer greater than one.

As shown in operation 130, each of the plurality of screen-space tiles capable of being affected by a projection of an effect sphere are identified for each of the plurality of photons. In the context of the present description, an effect sphere of a photon refers to the sphere of influence capable of influencing pixels and/or tiles associated therewith. In one embodiment, a copy of each photon may be inserted in (or associated with, etc.) each screen-space tile that would contain a projection of an effect sphere of that photon. In another embodiment, a copy of each photon may be placed in buckets corresponding to the plurality of screen-space tiles the photon is capable of affecting. In another embodiment, a pointer to each photon may be inserted in (or associated with, etc.) each screen-space tile that is capable of containing a projection of an effect sphere of that photon. In yet another embodiment, either a copy of, or a pointer to, each photon may be inserted in each screen-space tile that is capable of containing a projection of an effect sphere of the photon.

Further, in one embodiment, one or more chunks of photons associated with the screen-space tiles may be identified for processing. For example, in the case that there are more photons in a tile than fit in memory, multiple passes over a tile may be implemented, processing chunks of the photons in the tile in each pass. Additionally, in one embodiment, photons associated with the plurality of screen-space tiles that do not intersect a predefined depth range associated the plurality of screen-space tiles may be culled. For example, in one embodiment, during the process of categorizing the photons into tiles, a tiled algorithm may function to cull photons that do not intersect the depth range of the scene within a tile.

As shown further, in operation 140, at least a subset of photons associated with each of the screen-space tiles may be selected from which to compute shading. In one embodiment, selecting the subset of photons associated with each of the screen-space tiles from which to compute shading may include iterating over all pixels in each of the plurality of screen-space tiles. In another embodiment, selecting the subset of photons associated with each of the screen-space tiles from which to compute shading may include iterating over all pixels in each of the plurality of screen-space tiles and selecting a subset of the photons in each of the screen-space tiles from which to compute shading.

Furthermore, in one embodiment, selecting at least a subset of photons associated with each of the screen-space tiles from which to compute shading may include selecting all photons associated with each of the screen-space tiles (i.e. not just a subset, etc.). Additionally, in one embodiment, a stochastic process may be utilized to select the subset of photons associated with each of the screen-space tiles from which to compute shading. For example, in one embodiment, a subset of photons may be stochastically selected independently at each pixel. In yet another embodiment, an interleaving process may be utilized to select the subset of photons associated with each of the screen-space tiles from which to compute shading.

As shown in operation 150, shading is computed for the at least one scene utilizing the selected subset of photons. In one embodiment, computing the shading may include reconstructing smooth shading at each pixel associated with the at least one scene. Further, in one embodiment, computing the shading may include reconstructing smooth shading at each pixel associated with the at least one scene from neighbor pixel values.

Additionally, in one embodiment, computing the shading may include utilizing a lateral filter. Of course, in various embodiments, any number of filters that respect edges may be utilized to compute the shading. Still yet, in one embodiment, the method 100 may include rendering the at least one scene.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
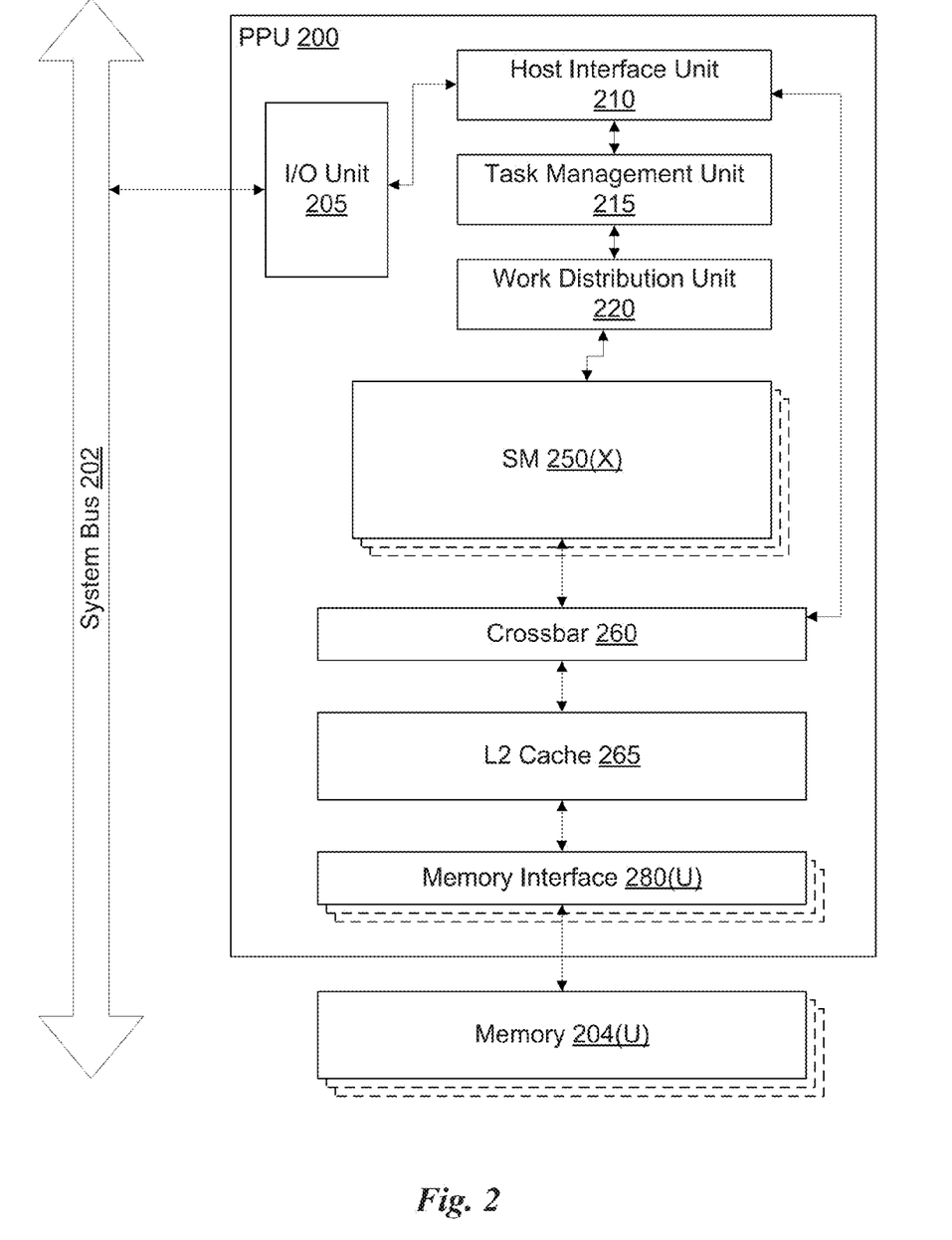
FIG. 2 illustrates a parallel processing unit (PPU), according to one embodiment.

FIG. 2 illustrates a parallel processing unit (PPU) 200, according to one embodiment. While a parallel processor is provided herein as an example of the PPU 200, it should be strongly noted that such processor is set forth for illustrative purposes only, and any processor may be employed to supplement and/or substitute for the same. In one embodiment, the PPU 200 comprises X streaming multi-processors (SMs) 250 and is configured to execute a plurality of threads concurrently in two or of the SMs 250(X). A thread (i.e., a thread of execution) is an instantiation of a set of instructions executing within a particular SM 250. Each SM 250, described below in more detail in conjunction with FIG. 3, may include, but is not limited to, one or more processing cores, one or more load/store units (LSUs), a level-one (L1) cache, shared memory, and the like.

In one embodiment, the PPU 200 includes an input/output (I/O) unit 205 configured to transmit and receive communications (i.e., commands, data, etc.) from a central processing unit (CPU) (not shown) over the system bus 202. The I/O unit 205 may implement a Peripheral Component Interconnect Express (PCIe) interface for communications over a PCIe bus. In alternative embodiments, the I/O unit 205 may implement other types of well-known bus interfaces.

The PPU 200 also includes a host interface unit 210 that decodes the commands and transmits the commands to the task management unit 215 or other units of the PPU 200 (e.g., memory interface 280) as the commands may specify. In one embodiment, the PPU 200 comprises U memory interfaces 280(U), where each memory interface 280(U) is connected to a corresponding memory device 204(U). The host interface unit 210 is configured to route communications between and among the various logical units of the PPU 200.

In one embodiment, a program encoded as a command stream is written to a buffer by the CPU. The buffer is a region in memory, e.g., memory 204 or system memory, that is accessible (i.e., read/write) by both the CPU and the PPU 200. The CPU writes the command stream to the buffer and then transmits a pointer to the start of the command stream to the PPU 200. The host interface unit 210 provides the task management unit (TMU) 215 with pointers to one or more streams. The TMU 215 selects one or more streams and is configured to organize the selected streams as a pool of pending grids. In one embodiment, a thread block comprises 32 related threads and a grid is an array of one or more thread blocks that execute the same stream and the different thread blocks may exchange data through global memory. The pool of pending grids may include new grids that have not yet been selected for execution and grids that have been partially executed and have been suspended.

A work distribution unit 220 that is coupled between the TMU 215 and the SMs 250 manages a pool of active grids, selecting and dispatching active grids for execution by the SMs 250. Pending grids are transferred to the active grid pool by the TMU 215 when a pending grid is eligible to execute, i.e., has no unresolved data dependencies. An active grid is transferred to the pending pool when execution of the active grid is blocked by a dependency. When execution of a grid is completed, the grid is removed from the active grid pool by the work distribution unit 220. In addition to receiving grids from the host interface unit 210 and the work distribution unit 220, the TMU 215 also receives grids that are dynamically generated by the SMs 250 during execution of a grid. These dynamically generated grids join the other pending grids in the pending grid pool.

In one embodiment, the CPU executes a driver kernel that implements an application programming interface (API) that enables one or more applications executing on the CPU to schedule operations for execution on the PPU 200. An application may include instructions (i.e., API calls) that cause the driver kernel to generate one or more grids for execution. In one embodiment, the PPU 200 implements a SIMT (Single-Instruction, Multiple-Thread) architecture where each thread block (i.e., warp) in a grid is concurrently executed on a different data set by different threads in the thread block. The driver kernel defines thread blocks that are comprised of k related threads, such that threads in the same thread block may exchange data through shared memory.

In one embodiment, the PPU 200 may include 15 distinct SMs 250. Each SM 250 is multi-threaded and configured to execute a plurality of threads (e.g., 32 threads) from a particular thread block concurrently. Each of the SMs 250 is connected to a level-two (L2) cache 265 via a crossbar 260 (or other type of interconnect network). The L2 cache 265 is connected to one or more memory interfaces 280. Memory interfaces 280 implement 16, 32, 64, 128-bit data buses, or the like, for high-speed data transfer. In one embodiment, the PPU 200 may be connected to up to 6 memory devices 204, such as graphics double-data-rate, version 5, synchronous dynamic random access memory (GDDR5 SDRAM).

In one embodiment, the PPU 200 implements a multi-level memory hierarchy. The memory 204 is located off-chip in SDRAM coupled to the PPU 200. Data from the memory 204 may be fetched and stored in the L2 cache 265, which is located on-chip and is shared between the various SMs 250. In one embodiment, each of the SMs 250 also implements an L1 cache. The L1 cache is private memory that is dedicated to a particular SM 250. Each of the L1 caches is coupled to the shared L2 cache 265. Data from the L2 cache 265 may be fetched and stored in each of the L1 caches for processing in the functional units of the SMs 250.

In one embodiment, the PPU 200 comprises a graphics processing unit (GPU). The PPU 200 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 200 can be configured to process the graphics primitives to generate a frame buffer (i.e., pixel data for each of the pixels of the display). The driver kernel implements a graphics processing pipeline, such as the graphics processing pipeline defined by the OpenGL API.

An application writes model data for a scene (i.e., a collection of vertices and attributes) to memory. The model data defines each of the objects that may be visible on a display. The application then makes an API call to the driver kernel that requests the model data to be rendered and displayed. The driver kernel reads the model data and writes commands to the buffer to perform one or more operations to process the model data. The commands may encode different shader programs including one or more of a vertex shader, hull shader, geometry shader, pixel shader, etc. For example, the TMU 215 may configure one or more SMs 250 to execute a vertex shader program that processes a number of vertices defined by the model data. In one embodiment, the TMU 215 may configure different SMs 250 to execute different shader programs concurrently. For example, a first subset of SMs 250 may be configured to execute a vertex shader program while a second subset of SMs 250 may be configured to execute a pixel shader program. The first subset of SMs 250 processes vertex data to produce processed vertex data and writes the processed vertex data to the L2 cache 265 and/or the memory 204. After the processed vertex data is rasterized (i.e., transformed from three-dimensional data into two-dimensional data in screen space) to produce fragment data, the second subset of SMs 250 executes a pixel shader to produce processed fragment data, which is then blended with other processed fragment data and written to the frame buffer in memory 204. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 200 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 200 is embodied on a single semiconductor substrate. In another embodiment, the PPU 200 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 200 may be included on a graphics card that includes one or more memory devices 204 such as GDDR5 SDRAM. The graphics card may be configured to interface with a PCIe slot on a motherboard of a desktop computer that includes, e.g., a northbridge chipset and a southbridge chipset. In yet another embodiment, the PPU 200 may be an integrated graphics processing unit (iGPU) included in the chipset (i.e., Northbridge) of the motherboard.

Figure 3:
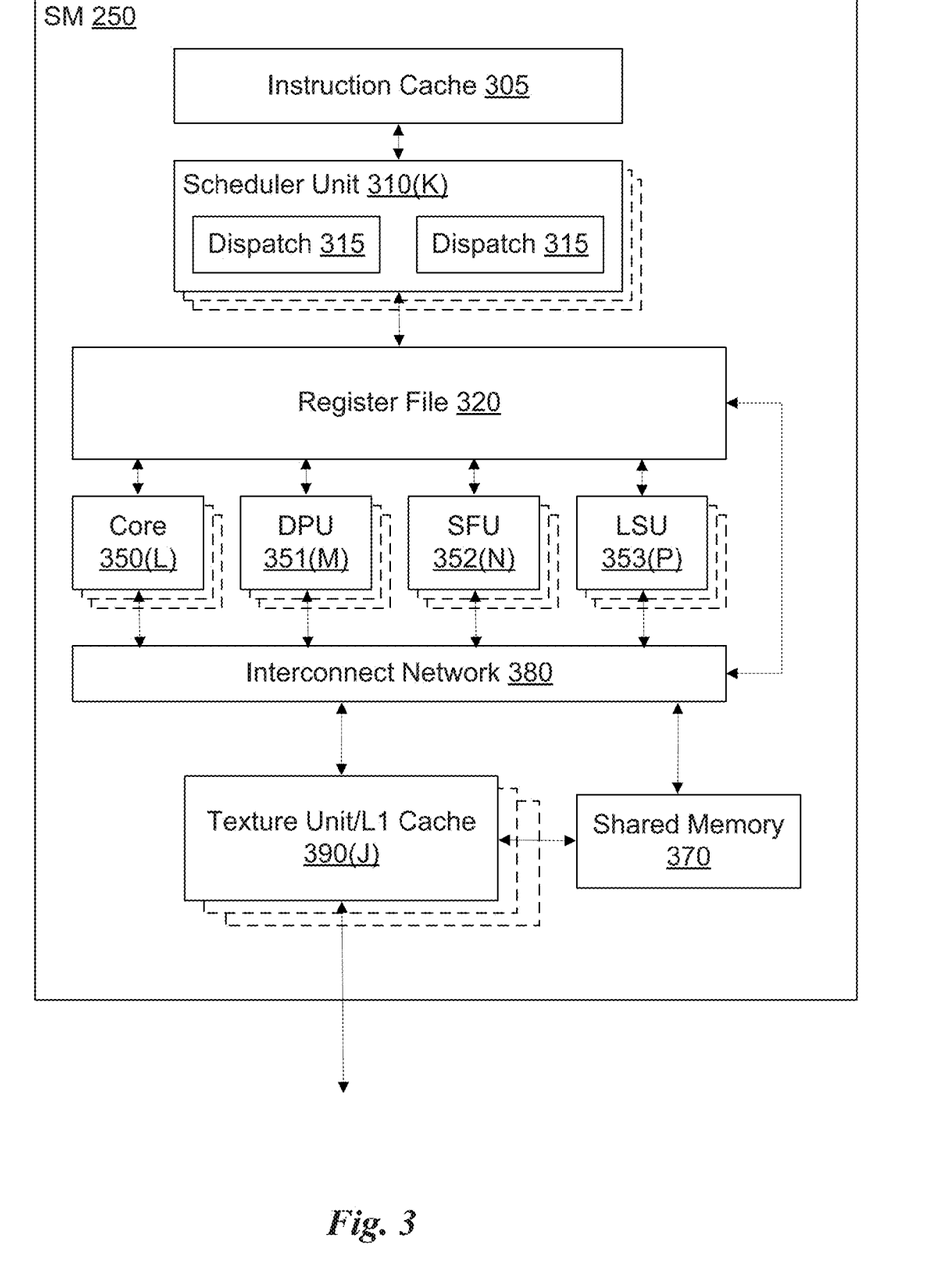
FIG. 3 illustrates the streaming multi-processor of FIG. 2, according to one embodiment.

FIG. 3 illustrates the streaming multi-processor 250 of FIG. 2, according to one embodiment. As shown in FIG. 3, the SM 250 includes an instruction cache 305, one or more scheduler units 310, a register file 320, one or more processing cores 350, one or more double precision units (DPUs) 351, one or more special function units (SFUs) 352, one or more load/store units (LSUs) 353, an interconnect network 380, a shared memory 370, and one or more texture unit/L1 caches 390.

As described above, the work distribution unit 220 dispatches active grids for execution on one or more SMs 250 of the PPU 200. The scheduler unit 310 receives the grids from the work distribution unit 220 and manages instruction scheduling for one or more thread blocks of each active grid. The scheduler unit 310 schedules threads for execution in groups of parallel threads, where each group is called a warp. In one embodiment, each warp includes 32 threads. The scheduler unit 310 may manage a plurality of different thread blocks, allocating the thread blocks to warps for execution and then scheduling instructions from the plurality of different warps on the various functional units (i.e., cores 350, DPUs 351, SFUs 352, and LSUs 353) during each clock cycle.

In one embodiment, each scheduler unit 310 includes one or more instruction dispatch units 315. Each dispatch unit 315 is configured to transmit instructions to one or more of the functional units. In the embodiment shown in FIG. 3, the scheduler unit 310 includes two dispatch units 315 that enable two different instructions from the same warp to be dispatched during each clock cycle. In alternative embodiments, each scheduler unit 310 may include a single dispatch unit 315 or additional dispatch units 315.

Each SM 350 includes a register file 320 that provides a set of registers for the functional units of the SM 350. In one embodiment, the register file 320 is divided between each of the functional units such that each functional unit is allocated a dedicated portion of the register file 320. In another embodiment, the register file 320 is divided between the different warps being executed by the SM 250. The register file 320 provides temporary storage for operands connected to the data paths of the functional units.

Each SM 250 comprises L processing cores 350. In one embodiment, the SM 250 includes a large number (e.g., 192, etc.) of distinct processing cores 350. Each core 350 is a fully-pipelined, single-precision processing unit that includes a floating point arithmetic logic unit and an integer arithmetic logic unit. In one embodiment, the floating point arithmetic logic units implement the IEEE 754-2008 standard for floating point arithmetic. Each SM 250 also comprises M DPUs 351 that implement double-precision floating point arithmetic, N SFUs 352 that perform special functions (e.g., copy rectangle, pixel blending operations, and the like), and P LSUs 353 that implement load and store operations between the shared memory 370 and the register file 320 via the J texture unit/L1 caches 390 and the interconnect network 380. The J texture unit/L1 caches 390 are coupled between the interconnect network 380 and the shared memory 370 and are also coupled to the crossbar 260. In one embodiment, the SM 250 includes 64 DPUs 351, 32 SFUs 352, and 32 LSUs 353.

In another embodiment, the L1 cache is not included within the texture unit and is instead included with the shared memory 370 with a separate direct connection to the crossbar 260.

Each SM 250 includes an interconnect network 380 that connects each of the functional units to the register file 320 and to the shared memory 370 through the interconnect network 380. In one embodiment, the interconnect network 380 is a crossbar that can be configured to connect any of the functional units to any of the registers in the register file 320, to any of the J texture unit/L1 caches 390, or the memory locations in shared memory 370.

In one embodiment, the SM 250 is implemented within a GPU. In such an embodiment, the SM 250 comprises J texture unit/L1 caches 390. The texture unit/L1 caches 390 are configured to access texture maps (i.e., a 2D array of texels) from the memory 204 and sample the texture maps to produce sampled texture values for use in shader programs. The texture unit/L1 caches 390 implement texture operations such as anti-aliasing operations using mip-maps (i.e., texture maps of varying levels of detail). In one embodiment, the SM 250 includes 16 texture unit/L1 caches 390. In one embodiment, the texture unit/L1 caches 390 may be configured to receive load and store requests from the LSUs 353 and to coalesce the texture accesses and the load and store requests to generate coalesced memory operations that are output to a memory system that includes the shared memory 370. The memory system may also include the L2 cache 265, memory 204, and a system memory (not shown).

The PPU 200 described above may be configured to perform highly parallel computations much faster than conventional CPUs. Parallel computing has advantages in graphics processing, data compression, biometrics, stream processing algorithms, and the like.

In one embodiment, the aforementioned systems may be utilized to implement photon mapping. Photon mapping includes emitting photons, tracing photons, and computing the scattered radiance by estimating the density of photons (i.e. shading, etc.). Photon emission and trace steps are similar to path tracing. They produce a series of scattering points along transport paths. Tracing stores an incident photon in a photon map at each scattering point. The choice of data structure for the map depends on the shading algorithm employed later.

Many variations on photon mapping intended for real-time rendering of complex scenes have been proposed. Combined with this algorithmic progress, GPUs are now powerful enough that photon may be utilized in real-time rendering systems.

Efficient parallel ray tracing hardware and software systems, such as OptiX, can trace hundreds of millions of rays per second and the process can be amortized over multiple frames. Thus, existing systems meet the performance needed for photon tracing. Net performance hinges on efficient photon shading. Accordingly, architecture-aware optimization of photon shading for parallel vector architectures may be implemented to increase the scalability of photon gathering (e.g. for achieving film quality lighting in interactive applications, etc.) and generally advance deferred shading on GPUs, utilizing a tiled deferred photon gathering implementation.

Figure 4A:
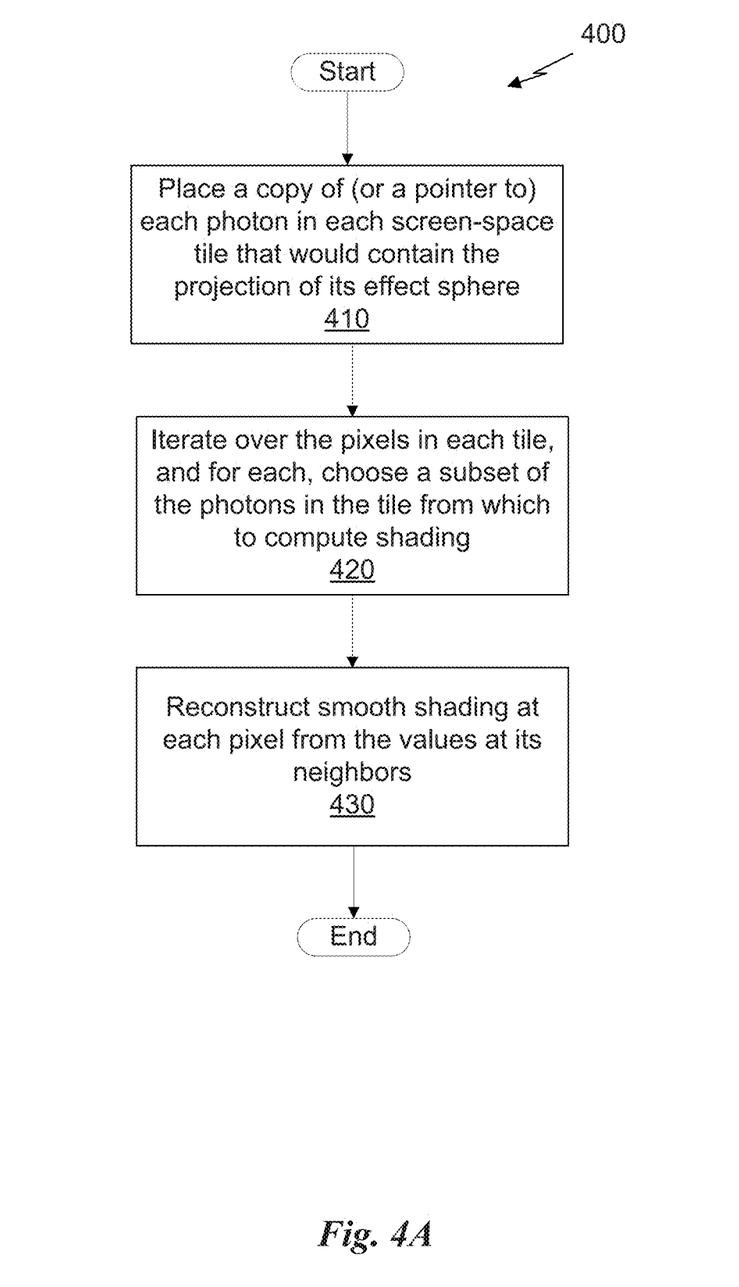
FIG. 4A illustrates a flowchart of a method for tiled deferred shading, in accordance with another embodiment.

FIG. 4A illustrates a flowchart of a method 400 for tiled deferred shading, in accordance with another embodiment. As an option, the method 400 may be implemented in the context of the previous Figures and/or any subsequent Figure(s). Of course, however, the method 400 may be implemented in any desired environment. It should also be noted that the aforementioned definitions may apply during the present description.

As shown in operation 410, a copy of (or a pointer to) each photon is placed in each screen-space tile that would contain the projection of its effect sphere. Furthermore, as shown in operation 420, iterations are performed over the pixels in each tile, and for each, a subset of the photons in the tile is chosen from which to compute shading. Moreover, as shown in operation 430, smooth shading is reconstructed at each pixel from the values at its neighbors.

Figure 4B:
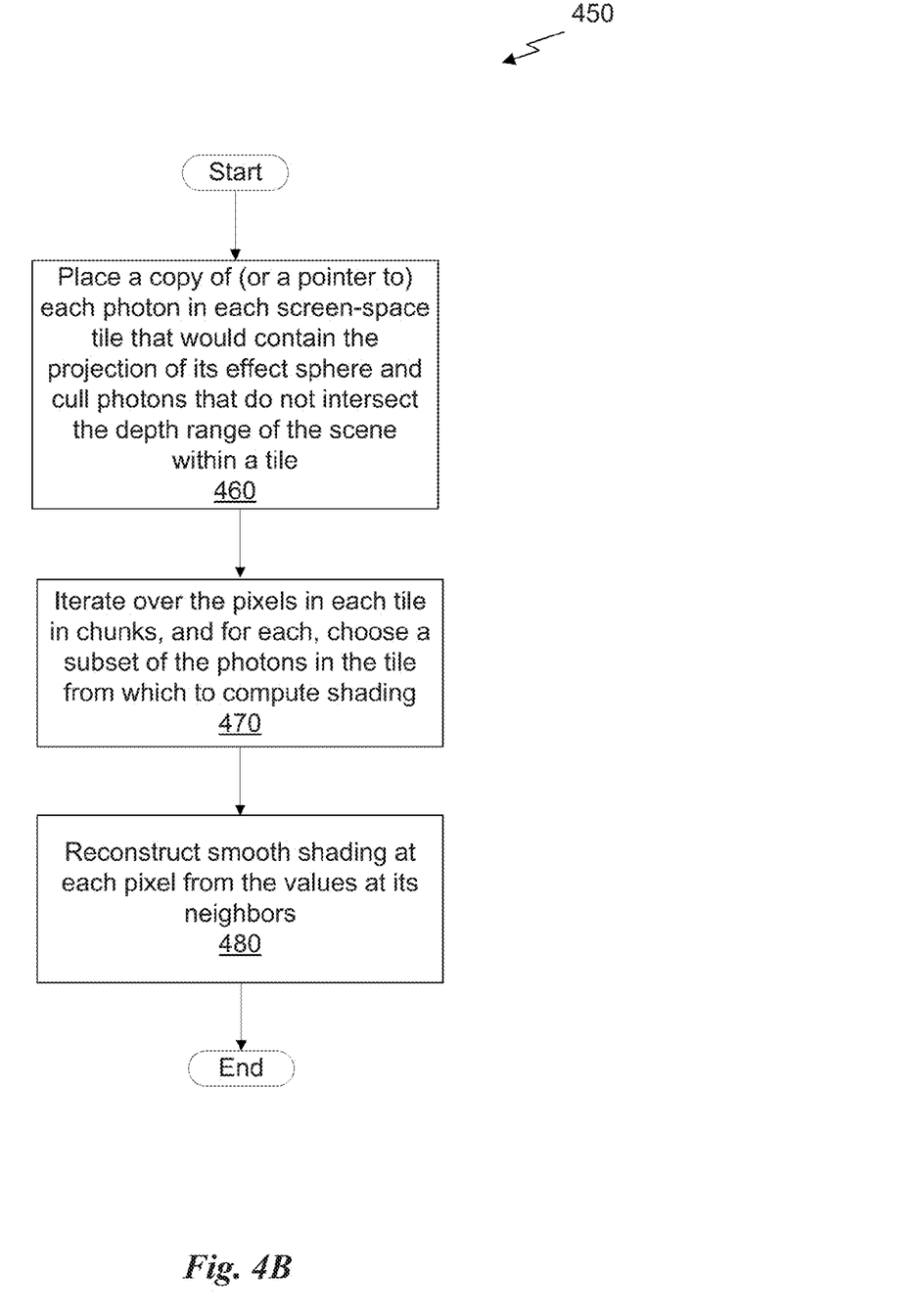
FIG. 4B illustrates a flowchart of a method for tiled deferred shading, in accordance with another embodiment.

FIG. 4B illustrates a flowchart of a method 450 for tiled deferred shading, in accordance with another embodiment. As an option, the method 450 may be implemented in the context of the previous Figures and/or any subsequent Figure(s). Of course, however, the method 450 may be implemented in any desired environment. It should also be noted that the aforementioned definitions may apply during the present description.

As shown in operation 460, a copy of (or a pointer to) each photon is placed in each screen-space tile that would contain the projection of its effect sphere, and photons that do not intersect the depth range of the scene within a tile are culled. Further, as shown in operation 470, iterations are performed over the pixels in each tile in chunks and a subset of the photons in the tile is chosen from which to compute shading. Additionally, smooth shading is reconstructed at each pixel from the values at its neighbors, as shown in operation 480.

In this way, in one embodiment, a tiled algorithm may be utilized to insert copies of each photon in buckets corresponding to the screen-space tiles it might affect. This allows for a second pass to shade all pixels within a tile from a common subset of photons that fit within shared memory for a compute shader.

In the case where there are more photons in a tile than fit in memory of the implementing system, multiple passes may be made over a tile, processing sizable chunks of the photons in the tile in each pass. In one embodiment, during the process of categorizing the photons into tiles, a tiled algorithm may function to cull photons that do not intersect the depth range of the scene within a tile. In scenes with high depth variance, that may launch many shading threads that immediately terminate, reducing vector lane occupancy without providing useful computation.

Table 1 shows exemplary code illustrative of a tile insertion pass, in accordance with one embodiment.

TABLE 1

```
let m = number of tiles
let photonCount[m], nextPhotonIndex[m] = arrays of 0s
for each photon P: # counting pass
    for each tile T with frustum intersecting the effect sphere of P:
        photonCount[T] += 1
for each tile T: # allocation pass
    allocate photonCount[T] photons in tilePhotons[T]
for each photon P: # copy pass
    for each tile T with frustum intersecting the effect sphere of P:
        s = atomicGetAndIncrement(nextPhotonIndex[T])
        tilePhotons[T][s] = P
```

In one embodiment, tiles may be further partitioned into chunks, each containing a bounded photon count. Each photon consumes little memory, thus in one embodiment, photons may be duplicated and embedded directly in the chunks instead of utilizing pointers. This also uses the cache efficiently and enables coalesced parallel memory fetches.

Table 2 shows exemplary code illustrative of tile gathering, in accordance with one embodiment.

TABLE 2

```
for each nxn tile T: # Thread launch
    let photon[ ] = shared memory array
    for each pixel (x, y) in T:
        load 1/n² of tile contents into photon[ ]
    for each pixel (x, y) in T with visible surface X:
        # Iterate through tile contents
        i = step(k²)−1
        count = 0; sum = 0
        while i < photon.length:
            ++count
            P = photon[i]
            sum += contribution of P at X
            p += step(k²)
        image[x, y] += sum *photon.length / count
```

In one embodiment, a subset of photons may be stochastically selected independently at each pixel. This allows simultaneously sampling over space and photons, preserving resolution. Additionally, for stochastic sampling during shading, as an option, statistically independent random numbers at each pixel may be utilized. Cooperative sampling methods may be utilized to dramatically increase convergence by coordinating samples at adjacent pixels. In one embodiment, a more sophisticated reconstruction filter may be utilized to reduce the number of samples required to achieve acceptable convergence.

As shown in Table 2, step(x) refers to a geometrically distributed random number generator representing samples of the number of trials until the first success a Bernoulli random variable with success probability 1/x. In one embodiment, the process may include incrementing by this value when iterating through the photon array to randomly sample 1/x photons on average.

Figure 5:
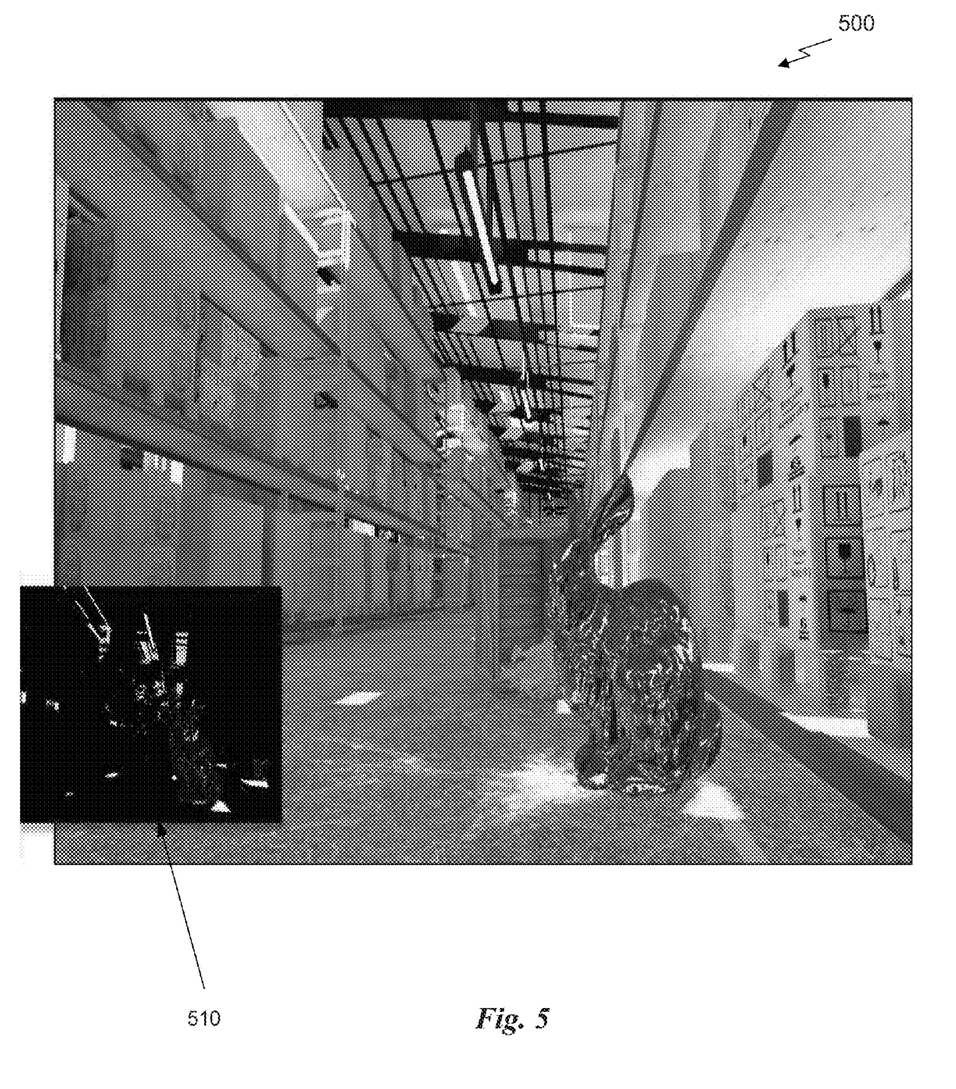
FIG. 5 illustrates an image created utilizing a tiled deferred shading implementation, in accordance with one embodiment.

FIG. 5 illustrates an image 500 created utilizing a tiled deferred shading implementation, in accordance with one embodiment. As an option, the image 500 may be viewed in the context of the previous Figures and/or any subsequent Figure(s). Of course, however, the image 500 may be viewed in the context of any desired environment. It should also be noted that the aforementioned definitions may apply during the present description.

The image 500 shows a warehouse in which small gaps create a complex, indirect paths for late afternoon sunlight from windows on the far right. In order to generate the image 500, a tiled algorithm was utilized to compute scattered indirect illumination from traced photons for this scene. The inset image 510 with only direct illumination shows the importance of rendering indirect light for this scene, as such image is indistinguishable.

In various embodiments, a deferred tile algorithm may be implemented as software (e.g. a CUDA implementation, etc.) or as hardware. In one embodiment, the tiled algorithm may use an output of a photon trace (e.g. computed in OptiX, etc.) and gather relevant photons onto each pixel in real time. As noted, each photon has, among other properties, a position and a radius of effect in 3D.

In one embodiment, the tiled algorithm may be configured to operate in three stages. At a first stage, a copy of (or a pointer to) each photon may be placed in each screen-space tile that would contain the projection of its effect sphere. As a second stage, the algorithm may function to iterate over the pixels in each tile, and for each, the algorithm may operate to choose a subset of the photons in the tile from which to compute shading. For the third stage, smooth shading may be reconstructed at each pixel from the values at its neighbors.

In various embodiments, the tiled deferred shading algorithm may be configured to ensure coherent execution within a vector/SIMD architecture, implement culling based on depth, and perform chunking for handling more photons than fit within shared memory and allowing efficient scheduling when different tiles have different numbers of photons.

Additionally, in various embodiments, at least portions of the tiled deferred shading algorithm may be directly implemented in a GPU (e.g. depth culling, etc.). As another option, the tiled deferred shading algorithm may be employed for real-time rendering in games, digital content creation (DCC), and CAD applications. Furthermore, in one embodiment, the tiled deferred shading algorithm may function to dramatically increase the scalability of photon gathering (e.g. for achieving film quality lighting in interactive applications, etc.).

Figure 6:
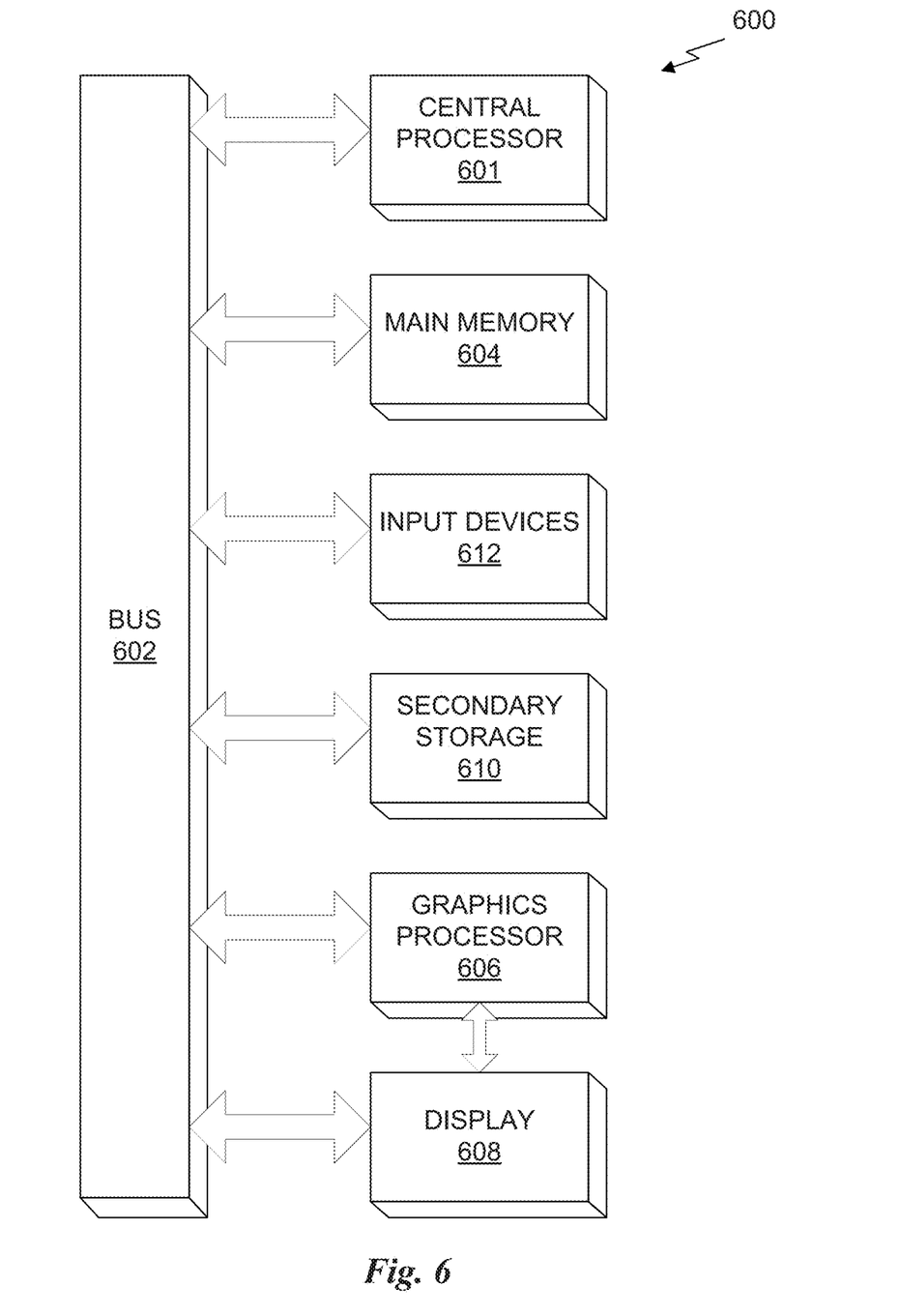
FIG. 6 illustrates an exemplary system in which the various architecture and/or functionality of the various previous embodiments may be implemented.

FIG. 6 illustrates an exemplary system 600 in which the various architecture and/or functionality of the various previous embodiments may be implemented. As shown, a system 600 is provided including at least one central processor 601 that is connected to a communication bus 602. The communication bus 602 may be implemented using any suitable protocol, such as PCI (Peripheral Component Interconnect), PCI-Express, AGP (Accelerated Graphics Port), HyperTransport, or any other bus or point-to-point communication protocol(s). The system 600 also includes a main memory 604. Control logic (software) and data are stored in the main memory 604 which may take the form of random access memory (RAM).

The system 600 also includes input devices 612, a graphics processor 606, and a display 608, i.e. a conventional CRT (cathode ray tube), LCD (liquid crystal display), LED (light emitting diode), plasma display or the like. User input may be received from the input devices 612, e.g., keyboard, mouse, touchpad, microphone, and the like. In one embodiment, the graphics processor 606 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 600 may also include a secondary storage 610. The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 604 and/or the secondary storage 610. Such computer programs, when executed, enable the system 600 to perform various functions. For example, a compiler program that is configured to examiner a shader program and enable or disable attribute buffer combining may be stored in the main memory 604. The compiler program may be executed by the central processor 601 or the graphics processor 606. The main memory 604, the storage 610, and/or any other storage are possible examples of computer-readable media.

In one embodiment, the architecture and/or functionality of the various previous figures may be implemented in the context of the central processor 601, the graphics processor 606, an integrated circuit (not shown) that is capable of at least a portion of the capabilities of both the central processor 601 and the graphics processor 606, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 600 may take the form of a desktop computer, laptop computer, server, workstation, game consoles, embedded system, and/or any other type of logic. Still yet, the system 600 may take the form of various other devices including, but not limited to a personal digital assistant (PDA) device, a mobile phone device, a television, etc.

Further, while not shown, the system 600 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   identifying a plurality of photons associated with at least one scene;
   identifying a plurality of screen-space tiles associated with the at least one scene;
   for each of the photons:
   (a) determining which of the plurality of screen-space tiles would contain a projection of an effect sphere of the photon,
   (b) storing a copy of, or a pointer to, the photon in a bucket corresponding to each of the determined screen-space tiles, and
   (c) for each of the screen-space tiles, culling the photon when the photon does not intersect a depth range of the scene within the screen-space tile,
   wherein (a)-(c) results in each of the screen-space tiles having a corresponding bucket with one or more photons therein;
   after performing (a)-(c) for each of the photons, selecting at least a subset of photons within each bucket from which to compute shading for the corresponding screen-space tile; and
   computing shading for the at least one scene by shading pixels within each screen-space tile utilizing the one or more photons selected from the corresponding bucket.

2. The method of claim 1, wherein computing the shading includes reconstructing smooth shading at each pixel associated with the at least one scene.

3. The method of claim 1, wherein computing the shading includes reconstructing smooth shading at each pixel associated with the at least one scene from neighbor pixel values.

4. The method of claim 1, wherein computing the shading includes utilizing a lateral filter.

5. The method of claim 1, wherein selecting the at least a subset of photons from which to compute shading includes iterating over all pixels in each of the plurality of screen-space tiles.

6. The method of claim 1, wherein selecting the at least a subset of photons from which to compute shading includes iterating over all pixels in each of the plurality of screen-space tiles and selecting a subset of the photons included in the corresponding bucket from which to compute shading.

7. The method of claim 1, wherein selecting at least a subset of photons from which to compute shading includes selecting all photons within each bucket.

8. The method of claim 1, wherein a stochastic process is utilized to select the at least a subset of photons from which to compute shading.

9. The method of claim 1, wherein an interleaving process is utilized to select the at least a subset of photons from which to compute shading.

10. The method of claim 1, further comprising storing a copy of each photon in each bucket corresponding to a screen-space tile that would contain the projection of the effect sphere of the photon.

11. The method of claim 1, further comprising inserting a pointer to each photon in each bucket corresponding to a screen-space tile that that would contain the projection of the effect sphere of the photon.

12. The method of claim 1, wherein the plurality of photons associated with the at least one scene are associated with a photon mapping process.

13. The method of claim 1, further comprising rendering the at least one scene.

14. A non-transitory computer-readable storage medium storing instructions that, when executed by a processor, cause the processor to perform steps comprising:
   identifying a plurality of photons associated with at least one scene;
   identifying a plurality of screen-space tiles associated with the at least one scene;
   for each of the photons:
   (a) determining which of the plurality of screen-space tiles would contain a projection of an effect sphere of the photon,
   (b) storing a copy of, or a pointer to, the photon in a bucket corresponding to each of the determined screen-space tiles, and
   (c) for each of the screen-space tiles, culling the photon when the photon does not intersect a depth range of the scene within the screen-space tile,
   wherein (a)-(c) results in each of the screen-space tiles having a corresponding bucket with one or more photons therein;
   after performing (a)-(c) for each of the photons, selecting at least a subset of photons within each bucket from which to compute shading for the corresponding screen-space tile; and
   computing shading for the at least one scene by shading pixels within each screen-space tile utilizing the one or more photons selected from the corresponding bucket.

15. A system comprising:
   a memory system; and
   one or more processing cores coupled to the memory system and that are each configured to:
   identify a plurality of photons associated with at least one scene;

identify a plurality of screen-space tiles associated with the at least one scene;

for each of the photons:

(a) determine which of the plurality of screen-space tiles would contain a projection of an effect sphere of the photon, (b) store a copy of, or a pointer to, the photon in a bucket corresponding to each of the determined screen-space tiles, and (c) for each of the screen-space tiles, cull the photon when the photon does not intersect a depth range of the scene within the screen-space tile, wherein (a)-(c) results in each of the screen-space tiles having a corresponding bucket with one or more photons therein;

after performing (a)-(c) for each of the photons, select at least a subset of photons within each bucket from which to compute shading for the corresponding screen-space tile; and compute shading for the at least one scene by shading pixels within each screen-space tile utilizing the one or more photons selected from the corresponding bucket.

\* \* \* \* \*